Oct. 19, 1965  F. C. ROBINSON  3,212,163
ELECTRICAL CAPACITORS
Filed June 28, 1962
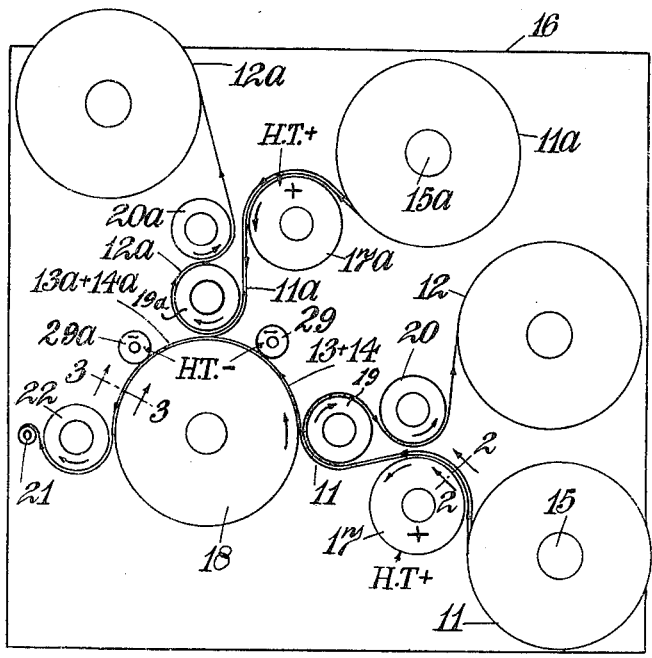
Fig.1.
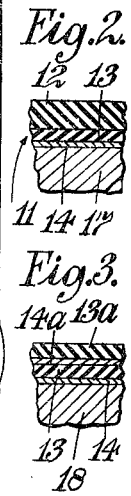
Fig.2.
Fig.3.
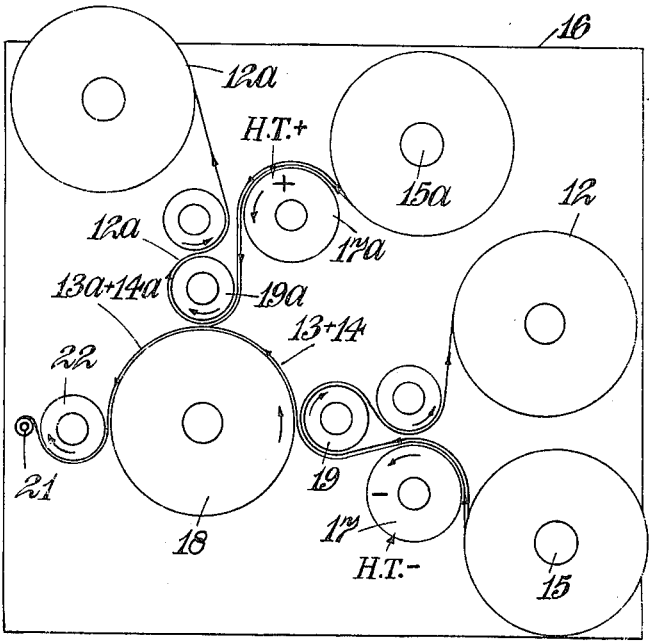
Fig.4.
INVENTOR
Frederick C. Robinson
By Watson, Cole, Grindle & Watson
ATTORNEYS

United States Patent Office 3,212,163
Patented Oct. 19, 1965

3,212,163
ELECTRICAL CAPACITORS
Frederick Chetham Robinson, London, England, assignor to A. H. Hunt (Capacitors) Limited, London, England, a company of Great Britain
Filed June 28, 1962, Ser. No. 206,010
Claims priority, application Great Britain, June 29, 1961, 23,612/61
4 Claims. (Cl. 29—25.42)

The invention relates to electrical capacitors.

The invention is concerned with the manufacture of electrical capacitors in which the dielectric consists of a very thin film of insulating material such as plastic which may not be strong enough to be self-supporting.

The electrodes used in conjunction with it are very thin layers of metal, for instance aluminium deposited by vacuum evaporation on the thin film.

Due to the manner of their manufacture, very thin films of plastic contain a number of holes and flaws which are penetrated by the metal which is deposited to form electrodes, and the films may also contain particles; both these result in short circuits in the capacitor at flaws in the dielectric.

Such short-circuit points are normally cleared by the passage of current through the wound capacitance unit which causes the metal at the short circuit point to be volatilised, but with a unit which contains a large number of such faults, it is very difficult to pass sufficient current to clear them without damaging the unit.

According to the invention a method of making capacitors with thin metallised film dielectrics (such as dielectrics not thick enough to be self supporting) mounted on a flexible support comprises the steps of feeding the supported film into a winding machine, separating the metallised dielectric film from the support at a position where the film is supported by a part of the machine moving with the film and maintaining the film thus supported in the remainder of its passage through the machine until it is wound into a roll for example into a capacitance unit. Preferably two films are wound into each capacitor.

Preferably in the machine all parts of the dielectric film to be wound are subject progressively to a potential difference between their surfaces so that where there are flaws in the dielectric film current flows and the metallisation at the flaws is volatilised, thus preventing short circuits in the resulting capacitance unit. All parts of the film to be wound may be subjected progressively to a potential difference by means of a system of electrically conducting rollers maintained at different potentials, through which system the films are passed.

The unsupported film after being subjected to the potential difference may be wound into a capacitance unit in the same machine. Alternatively it could be wound into a roll for rolling into a capacitance unit later, but in that case when wound, the capacitor winding machine must be such that parts of it support the otherwise unsupported film through its passage into the capacitor roll.

Preferably the dielectric is formed by coating a support with a dielectric material in solution and then evaporating the solvent. The dielectric may be formed by coating a polyethelene terephthalate support, with cellulose acetate dissolved in acetone, preferably to form a dielectric between 1 and 4 microns thick. Alternatively the film may be polyester such as polyethylene carbonate or may be a thermo-plastic or thermo-setting material applied in any suitable manner with or without a solvent. The metallization is preferably aluminium deposited by vacuum evaporation but it may be zinc, cadmium or magnesium.

In one form of the invention there are narrow unmetallized bands in a wide film so that the sheet can be slit with one cut along each unmetallized band and one along each metallized band so that a number of strips are produced, each with one unmetallized margin.

The following is a description by way of example of a capacitor winding apparatus for carrying out a method according to the invention, with reference to the accompanying drawings in which:

FIGURE 1 is a side elevation of a winding apparatus;

FIGURE 2 is a fragmentary section on the line 2—2 of FIGURE 1 on a different scale;

FIGURE 3 is a fragmentary section on the line 3—3 of FIGURE 1 and,

FIGURE 4 shows an alternative winding apparatus in elevation.

Two rolled composite strips 11, 11a each comprising (1) a flexible support 12, 12a in sheet form (2) film 13, 13a and (3) metal 14, 14a are mounted on carriers 15, 15a on a frame 16 of the machine. The films 13a each have one demetallized margin (not shown) for facilitating electrical connections to the resulting capacitor.

During the winding operations the rollers all rotate in the direction indicated by arrows and the strips and supports also move in the direction indicated by arrows. The strips 11, 11a are carried over metal rollers 17, 17a insulated from the rest of the machine and charged to a positive voltage, the metallization 14, 14a on the strips being in contact with the rollers, 17, 17a. Both strips 11, 11a then pass to a larger diameter roller 18 of insulating material with the metallized side down; at the entry points to the roller 18 comprising the nips between the two rollers 18, 19 or 18, 19a the supports 12, 12a are peeled away from the thin film by leading the supports 12, 12a away round small diameter rollers 19, 19a which hold the composite strips 11, 11a on the insulating rollers 18 at the positions where the films 13, 13a is separated from the support and allows the metallized film to travel round the large roller 18. The supports 12, 12a conveniently pass over spring tensioner rollers 20a and are then wound into rolls. The film 11 meets the rollers 18 before the film 11a does, so film 11 after stripping from the support 12 is supported directly by the roller 18 and film 11a after stripping from support 12a is supported on roller 18 with the interposition of film 11.

On the surface of the films 11, 11a on the insulating roller 18 just past each position where the support has been separated from the film are rollers 29, 29a insulated from the frame and maintained at a negative voltage. As each strip 13, 13a passes in contact with a negatively charged roller, breakdown of the metallization 14, 14a at flaws in the dielectric occurs as the positively charged metallization comes into contact with the negatively charge rollers 29, 29a. This step is necessary to prevent short circuits in the resulting capacitor.

At a point further round the large roller 18 than both entry points the combined films 13, 13a are picked up by a reversing roller 22 which holds the films in contact with the roller 18 and are thence transferred to a small diameter winding spindle 21. The reversing roller 22 is in contact with the capacitor being wound on the spindle 21 a light contact being maintained by a spring (not shown) which urges the spindle 21 toward roller 22 but allows the winding spindle 21 to move away from the reversing roller 22 to accommodate the material being wound on it. In this way the films 13, 13a are both supported by contact with a roller (first 18 and then 22) from the time they leave their flexible supports 12, 12a until they are wound into a capacitor. The reversing roller 22 is used so that the capacitor unit can be wound with the metallized side facing the inside of the winding.

Thus a capacitor is produced in which the faults in the dielectric are cleared individually during the process of parting the film from its support and winding it into a capacitor unit.

In the modified form of apparatus for carrying out the invention shown in FIGURE 4 both negatively charged rollers 29, 29a are omitted and one of the formerly positively charged rollers (17) is negatively charged. Breakdown then occurs for the film 13 on the large insulating roller 18 as it joins the roller because it then becomes sandwiched between the oppositely charged metallization layers 14, 14a of the upper and lower films. For the film 13a, breakdown occurs at the surface of the capacitor as it is being wound. This film 13a is sandwiched between its own metallization 14 and the metallization 14a of the outer film which was wound a turn earlier; as these metallization layers are oppositely charged the metallization breaks down here. This alternative method is suitable for small capacitors only because the capacitor is being continually charged up by the oppositely charged rollers 17, 17a and discharged through a breakdown; with a large capacitor much energy is released on discharge so that the capacitor may be destroyed.

I claim:

1. A method of making wound capacitors with two thin metallized dielectric films comprising the steps of
    (a) taking the films while mounted on flexible backing supports and feeding each film into the nip between a pair of rollers urged towards contact with one another,
    (b) peeling the flexible backing support off each film at the exit from the nip into which it has been fed while leading each film around the roller with which it is running at said nip and so maintaining it supported by the roller,
    (c) bringing the films together while so supported,
    (d) maintaining them continuously supported by contact with a roller surface up to the point of winding into a capacitor, and
    (e) winding of the films into a capacitor.

2. A method as claimed in claim 1 wherein the metallized surface of each film is electrified by applying an electrical potential to one of the rollers in contact with it during its passage and bringing each film during the passage so that its non-metallized surface engages another surface of opposite polarity, so that faults are burnt out while the film is continuously supported.

3. A method as claimed in claim 2 wherein there are two films, of which one film has said faults burnt out before it is brought together with the other film and of which the other film has its metallized surface electrified before it is brought together with said one film and has its non-metallized surface brought into engagement with a surface of opposite polarity after the two films have been brought together.

4. A method as claimed in claim 2 wherein there are two films which have their metallized surfaces electrified before the films are brought together, said metallized surfaces being electrified to the opposite polarities whereby said faults in one film are burnt out as the two films are brought together and whereby said faults in the other film are burnt out as the films are wound into a capacitor.

References Cited by the Examiner

UNITED STATES PATENTS

| | | | |
|---|---|---|---|
| 2,045,534 | 6/36 | Stevens | 242—67.3 |
| 2,950,070 | 8/60 | Thorson | 29—25.42 |
| 2,724,562 | 11/55 | Purdy | 242—56.1 |

RICHARD H. EANES, JR., *Primary Examiner.*